(12) United States Patent
Shiao

(10) Patent No.: US 10,798,996 B2
(45) Date of Patent: Oct. 13, 2020

(54) METHOD AND DEVICE FOR FORMING SHOE UPPER DECORATION

(71) Applicant: DAH LIH PUH CO., LTD., Taichung (TW)

(72) Inventor: Jui-Fen Shiao, Taichung (TW)

(73) Assignee: Dah Lih Puh Co., Ltd., Taichung (TW)

( * ) Notice: Subject to any disclaimer, the term of this patent is extended or adjusted under 35 U.S.C. 154(b) by 240 days.

(21) Appl. No.: 15/950,910

(22) Filed: Apr. 11, 2018

(65) Prior Publication Data

US 2019/0313744 A1    Oct. 17, 2019

(51) Int. Cl.
| | |
|---|---|
| *B29C 51/42* | (2006.01) |
| *A43D 8/24* | (2006.01) |
| *B29C 51/36* | (2006.01) |
| *B29C 51/12* | (2006.01) |
| *B29C 51/10* | (2006.01) |
| *B29L 31/50* | (2006.01) |
| *A43B 3/00* | (2006.01) |

(52) U.S. Cl.
CPC .............. *A43D 8/24* (2013.01); *B29C 51/105* (2013.01); *B29C 51/12* (2013.01); *B29C 51/36* (2013.01); *B29C 51/421* (2013.01); *A43B 3/0078* (2013.01); *B29L 2031/505* (2013.01)

(58) Field of Classification Search
None
See application file for complete search history.

(56) References Cited

U.S. PATENT DOCUMENTS

2017/0071291 A1\*    3/2017  Follet ...................... A43D 8/24

\* cited by examiner

*Primary Examiner* — Monica A Huson
(74) *Attorney, Agent, or Firm* — Wang Law Firm, Inc.

(57) ABSTRACT

A method and a device for forming shoe upper decoration essentially include a machine, an upper mould and a lower mould. The upper and lower silica gel sheets are separated from the upper and lower heaters by a distance, which provides a suspended indirect heating mode to prevent the upper of the shoe from being deformed by the direct heating of the heat source, and to achieve the purpose of reducing the possibility of non-conforming products.

7 Claims, 6 Drawing Sheets

METHOD AND DEVICE FOR FORMING SHOE UPPER DECORATION

BACKGROUND OF THE INVENTION

Field of the Invention

The present invention relates to a method and a device for forming shoe upper decoration, and more particularly to a method and a device for forming shoe upper decoration by using vacuum suction and heating.

Related Prior Art

The upper of a shoe is normally decorated with various lines or patterns in order to enhance aesthetic appeal, and the forming of the decorative patterns usually requires the use of hot pressing machine. The hot pressing machine is usually provided with a shoe mould which comprises a male mould member and a female mould member, and then the upper of a semi-finished product is placed in the mould to form the decorative patterns on the upper by heating and pressing.

The heater of the male and female members of the existing hot pressing machine is a contact heater, therefore, when the shoe mould is heating and pressing the upper, the heat generated by the shoe mould might be transmitted directly to the upper to cause softening and deformation of the decorative patterns, which will increase the possibility of non-conforming products and reduce the operating efficiency and molding quality of the hot pressing machine.

The present invention has arisen to mitigate and/or obviate the afore-described disadvantages.

SUMMARY

One objective of the invention is to provide a method and a device for forming shoe upper decoration, which provides a suspended indirect heating mode to prevent the upper of the shoe from being deformed by the direct heating of a heat source.

Another objective of the present invention is to provide a method and a device for forming shoe upper decoration, which is capable of solving the air-enveloping problem of the prior art by using lateral air suction. In addition, the invention can carry out positive pressure to press the upper mould and the lower mould in order to assist molding of semi-finished upper.

To achieve the above objectives, a device for forming shoe upper decoration of the invention comprises:

a machine;

an upper mould mounted on the machine in an extensible and retractable manner and including: an upper mould member with an upper mould cavity, an upper metal frame which is formed with an upper-metal-frame cavity and disposed in the upper mould cavity, an upper heater disposed in the upper-metal-frame cavity, and an upper silica gel sheet replaceably disposed on the upper metal frame to cover the upper-metal-frame cavity and located a distance from the upper heater; and two lower moulds movably mounted on the machine, capable of being connected to or disconnected from the upper mould, and including two lower mould members, each of the lower mould members including: a lower mould cavity, a lower metal frame which is formed with a lower-metal-frame cavity and disposed in the lower mould cavity, a lower heater disposed in the lower-metal-frame cavity, and a lower silica gel sheet replaceably disposed on the lower metal frame to cover the lower-metal-frame cavity and located a distance from the lower heater.

Preferably, the upper heater includes at least one upper heating member disposed inside the upper heater.

Preferably, the upper heating member is an infrared lamp.

Preferably, each of the lower heaters includes at least one lower heating member.

Preferably, the at least one lower heating member is an infrared lamp.

Preferably, an upper airflow passage is formed between the upper mould cavity and the upper metal frame, and the upper mould includes an upper mould outlet in communication with the upper airflow passage and running through the upper mould cavity.

Preferably, a lower airflow passage is formed between each of the lower mould cavities and a corresponding one of the lower metal frames, and each of the lower moulds includes a lower mould outlet in communication with the lower airflow passage and running through a corresponding one of the lower mould cavities.

Preferably, two spaced first positioning locks and two spaced second positioning locks aligned with the first positioning locks are disposed at two sides of each of the lower moulds.

A method for forming shoe upper decoration comprising:

a step of setting including putting an upper silica gel sheet on an upper mould and a lower silica gel sheet on a lower mould;

a step of placing including placing a semi-finished upper on the lower silica gel sheet;

a step of air tightening including moving and pressing the upper mould against the lower mould to create an air suction chamber;

a step of air drawing including drawing air in lateral directions to create negative pressure in the air suction chamber;

a step of heating including using an upper heater in the upper mould and a lower heater in the lower mould to heat the semi-finished upper; and a step of air blowing including applying pressure, by a positive pressure air source, to the upper silica gel sheet of the upper mould and the lower silica gel sheet of the lower mould to form decoration on the semi-finished upper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
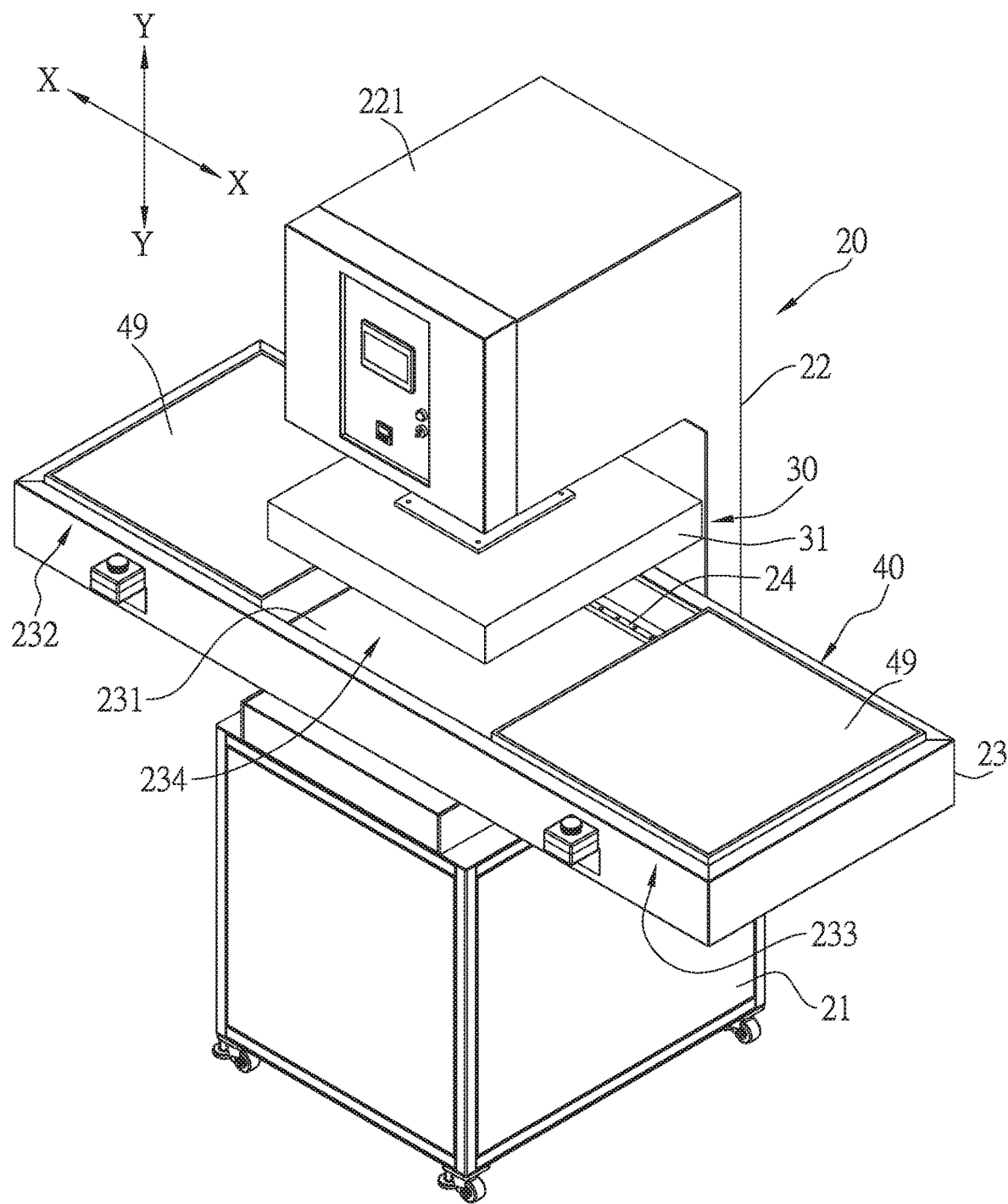
FIG. 1 is a perspective view of a device for forming shoe upper decoration in accordance with the invention.
Figure 2:
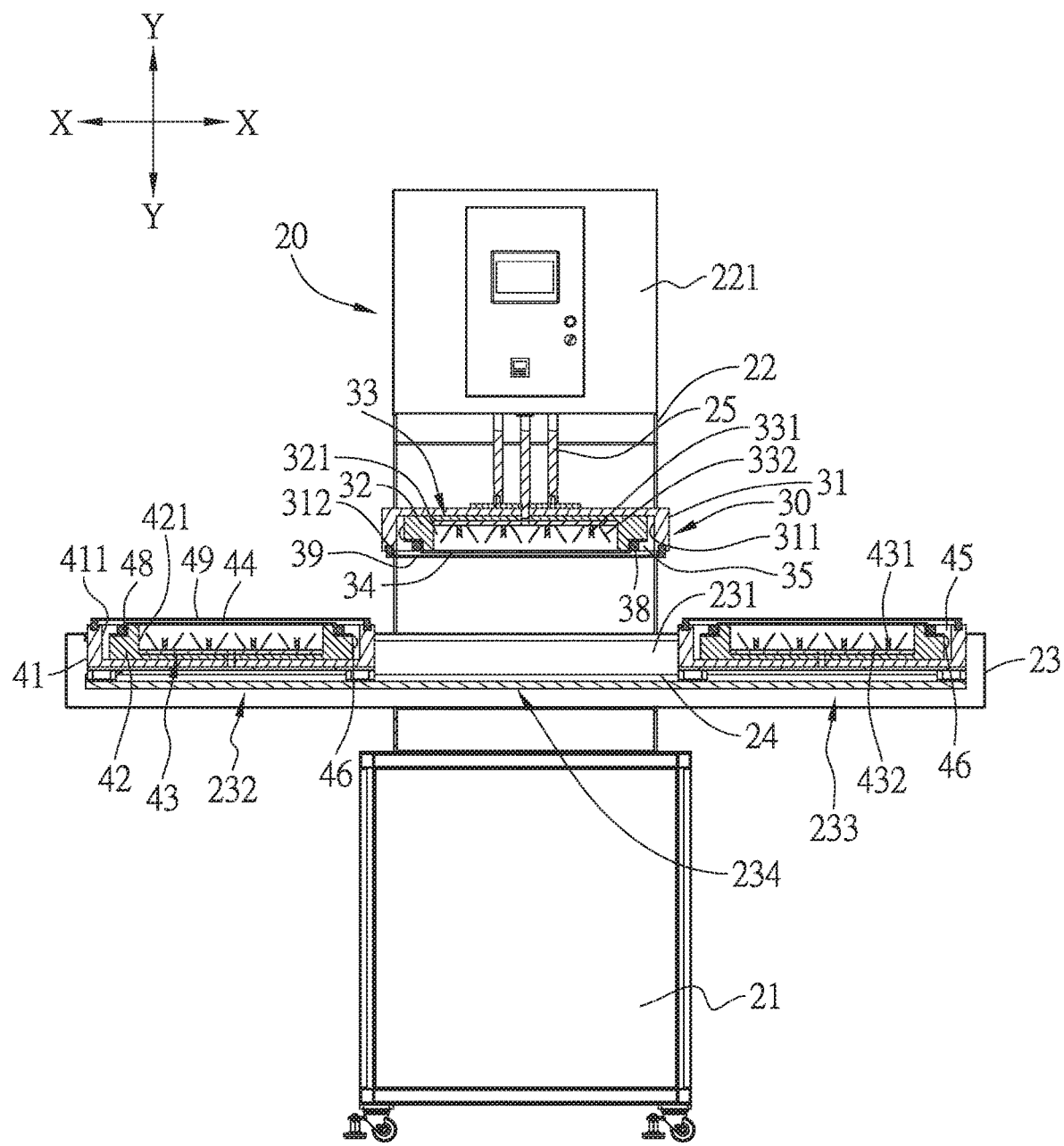
FIG. 2 is a cross sectional view of a device for forming shoe upper decoration in accordance with the invention.

Referring to FIGS. 1-2, a method and a device for forming shoe upper decoration in accordance with a preferred embodiment of the invention comprises: a machine 20, an upper mould 30 and two lower moulds 40.

The machine 20 includes a main housing 21, a U-shaped distribution seat 22 located above the main housing 21, and a bearing platform 23 arranged between the main housing 21 and the distribution seat 22 and connected to the distribution seat 22. The distribution seat 22 is provided with a distribution portion 221. The bearing platform 23 is a rectangular structure, and has a slide groove 231 facing the distribution portion 221, and a slide rail assembly 24 which is set in the slide groove 231. The bearing platform 23 includes a first cooling area 232, a second cooling area 233, and a heating area 234 disposed between the first and second cooling areas 232, 233 and located towards the distribution portion 221. The machine 20 includes an X-axial direction X and a Y-axial direction Y perpendicular to the X-axial direction X. At least two telescopic rods 25 are disposed below the distribution portion 221 and capable of repeatedly extending and retracting along the Y-axial direction Y to drive the upper mould 30 to move up and down.

Figure 3:
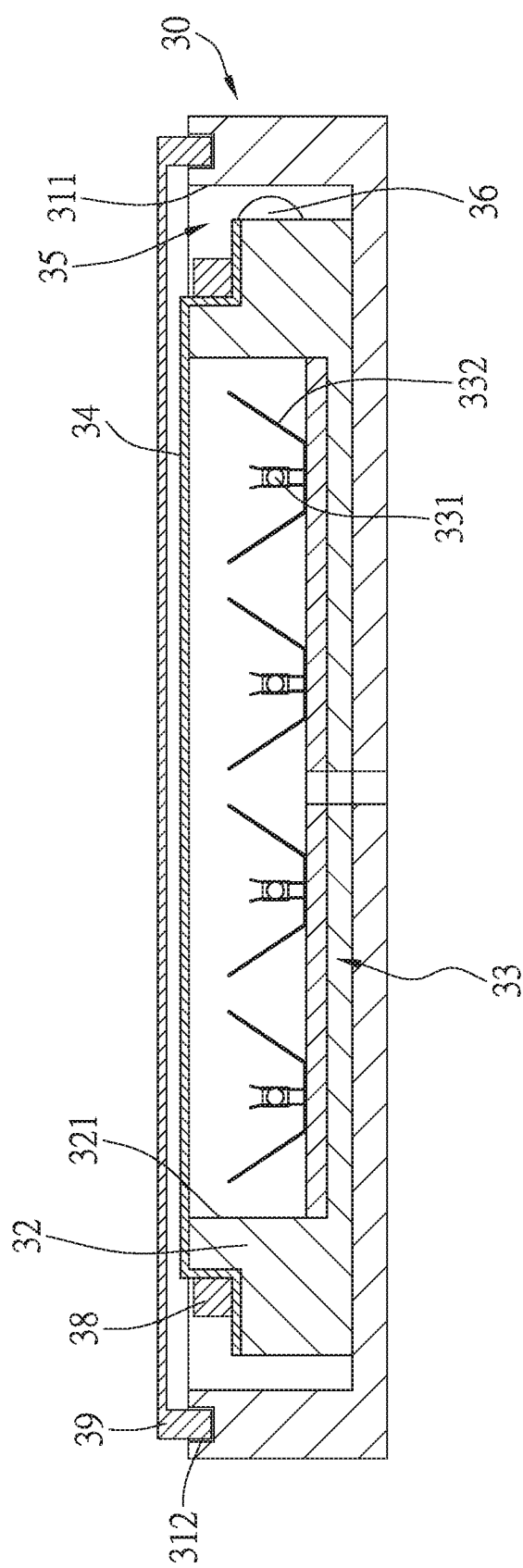
FIG. 3 is a cross sectional view of the upper mould of the device for forming shoe upper decoration in accordance with the invention.

Referring to FIG. 2, the upper mould 30 is fixed to the telescopic rods 25 and includes: an upper mould member 31 with an upper mould cavity 311, an upper metal frame 32 which is formed with an upper-metal-frame cavity 321 and disposed in the upper mould cavity 311, an upper heater 33 disposed in the upper-metal-frame cavity 321, and an upper silica gel sheet 34 replaceably disposed on the upper metal frame 32 to cover the upper-metal-frame cavity 321 and located a distance from the upper heater 33. In this embodiment, the upper heater 33 includes at least one upper heating member 331 disposed inside the upper heater 33, and there are four upper heating members 331 for example but not limited to, and the upper heating members 331 are infrared lamps. An upper airflow passage 35 is formed between the upper mould cavity 311 and the upper metal frame 32, as shown in FIG. 3, and the upper mould 30 includes an upper mould outlet 36 in communication with the upper airflow passage 35 and running through the upper mould cavity 311. Inside the upper heater 33 are provided at least two V-shaped upper diffusion sheets 332 covering the respective upper heating members 331 to increase and centralize the infrared energy generated from the upper heating members 331. The upper silica gel sheet 34 is locked to the upper metal frame 32 in a replaceable and removable manner, and an upper mould ring 38 is sleeved onto the upper silica gel sheet 34 to fix the upper silica gel sheet 34 to the upper metal frame 32. The upper mould member 31 is provided around a peripheral edge thereof with an upper mould sealing groove 312 surrounding the upper mould cavity 311, and an upper mould seal ring 39 is received in the upper mould sealing groove 312. Thus, the upper silica gel sheet 34 is separated from the upper heater 33 by a distance, which provides a suspended indirect heating mode to prevent the upper of the shoe from being deformed by the direct heating of the heat source, and to achieve the purpose of reducing the possibility of non-conforming products.

Figure 4:
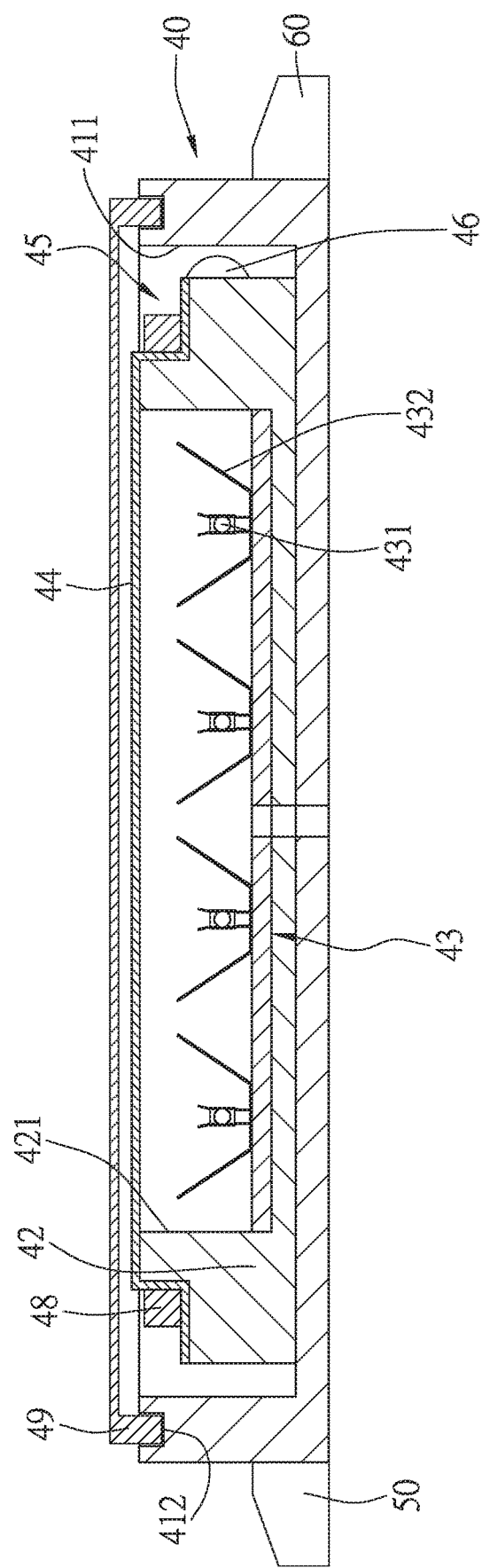
FIG. 4 is a cross sectional view of the lower mould of the device for forming shoe upper decoration in accordance with the invention.

Referring to FIG. 2 again, the two lower moulds 40 are movably mounted on the slide rail assembly 24 of the machine 20, can be connected to or disconnected from the upper mould 30, respectively, and include two lower mould members 41. Each of the lower mould members 41 includes: a lower mould cavity 411, a lower metal frame 42 which is formed with a lower-metal-frame cavity 421 and disposed in the lower mould cavity 411, a lower heater 43 disposed in the lower-metal-frame cavity 421, and a lower silica gel sheet 44 replaceably disposed on the lower metal frame 42 to cover the lower-metal-frame cavity 421 and located a distance from the lower heater 43. In this embodiment, the two lower moulds 40 are able to move back and forth along the X-axial direction X to move between the first cooling area 232, the second cooling area 233 and the heating area 234. Each of the lower heaters 43 includes at least one lower heating member 431 disposed inside the lower heaters 43, and there are four lower heating members 431 for example but not limited to, and the lower heating members 431 are infrared lamps. A lower airflow passage 45 is formed between each of the lower mould cavities 411 and a corresponding one of the lower metal frames 42, as shown in FIG. 4, and each of the lower moulds 40 includes a lower mould outlet 46 in communication with the lower airflow passage 45 and running through the lower mould cavity 411. Inside each of the lower heaters 43 are provided at least two V-shaped lower diffusion sheets 432 covering the respective lower heating members 431 to increase and centralize the infrared energy generated from the lower heating members 431. Each of the lower silica gel sheets 44 is locked to a corresponding one of the lower metal frames 42 in a replaceable and removable manner, and a lower mould ring 48 is sleeved onto each of the lower silica gel sheets 44 to fix the lower silica gel sheets 44 to the lower metal frames 42. Each of the lower mould members 41 is provided around a peripheral edge thereof with a lower mould sealing groove 412 surrounding the lower mould cavity 411, and a lower mould seal ring 49 is received in the lower mould sealing groove 412. Thus, the lower silica gel sheets 44 are separated from the lower heaters 43 by a distance, which provides a suspended indirect heating mode to prevent the lower of the shoe from being deformed by the heat source of heating, and to achieve the purpose of reducing the possibility of non-conforming products.

Figure 5:
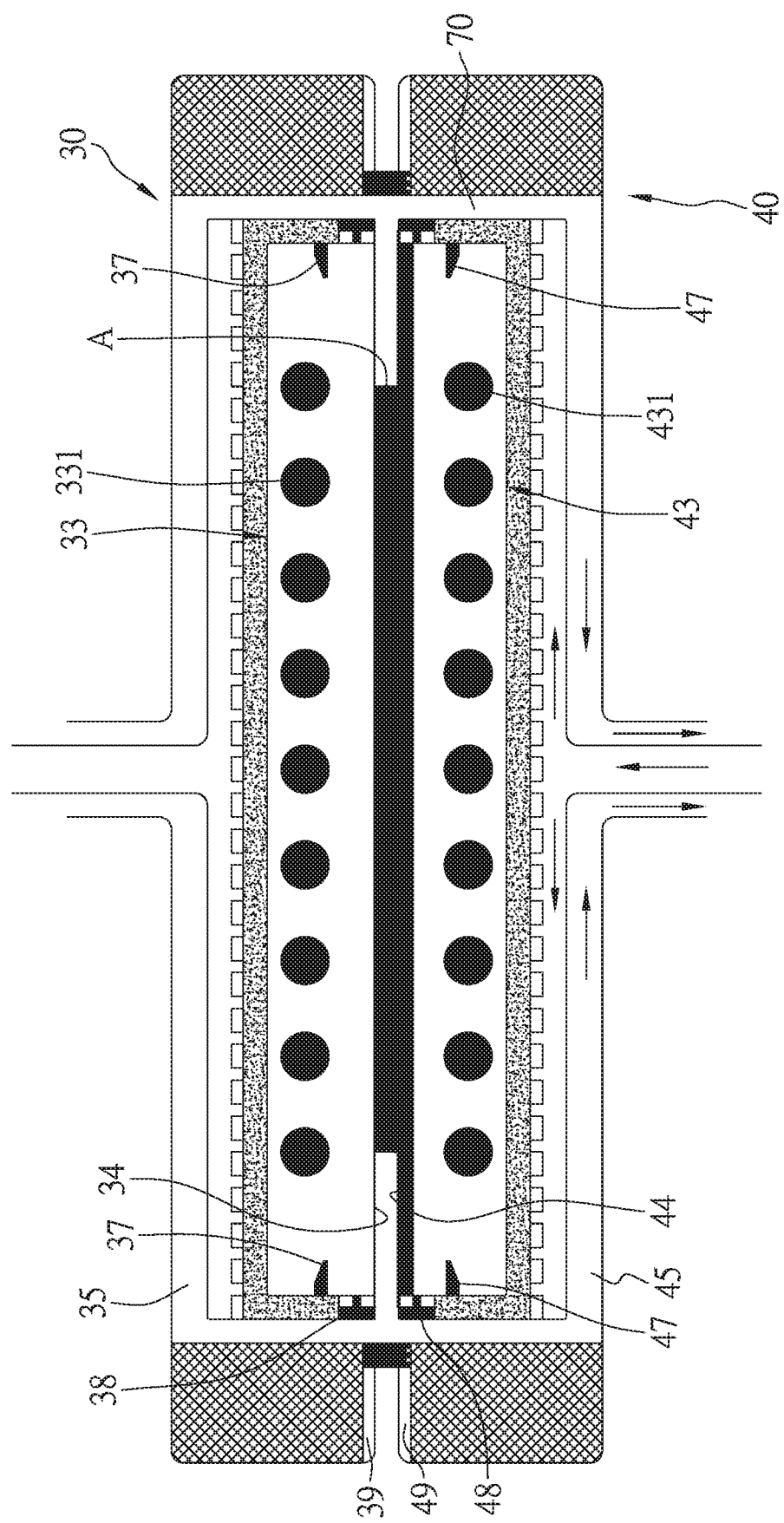
FIG. 5 is an illustrative view showing the mould pressing operation in accordance with the invention.

When the machine 20 is in use, as shown in FIG. 5, a semi-finished upper A is put on one of the lower moulds 40 that is movably disposed in the heating area 234 (not shown), and another of the lower moulds 40 is waiting in the first cooling area 232 or the second cooling area 233. At this moment, the upper mould 30 will move downwards along the Y-axial direction Y to press the lower mould 40 that is located in the heating area 234, so that the semi-finished product A of the upper can be heated and activated. The upper heating member 331 and the lower heating members 431 heat the semi-finished upper A indirectly through the upper silica gel sheet 34 and the lower silica gel sheet 44 in a non-contact manner by using infrared radiation, which can avoid deformation due to softening of or damage to the semi-finished upper A caused by high temperature, and the whole heating of the semi-finished upper A can be faster and more concentrated, so as to reduce the possibility of non-conforming products. In addition, vacuum operation is used during the process of hot pressing, the air in the middle will be pushed in the left and the right directions during hot pressing operation, and the upper mould seal ring 39 and the lower mould seal ring 49 will be pressed together to block external air to produce an airtight state between the upper mould 30 and the corresponding lower mould 40. Meanwhile, the air between the upper mould 30 and the corresponding lower mould 40 is drawn out via the upper and lower airflow passages 35, 45.

It is to be noted that, as shown in FIG. 4, two spaced first positioning locks 50 and two spaced second positioning locks 60 aligned with the first positioning locks 50 are disposed at two sides of each of the lower moulds 40.

As shown in FIG. 5, the upper mould 30 includes a pair of upper mould optical sensors 37 disposed in the upper mould cavity 311, each of the lower moulds 40 includes a pair of lower mould optical sensors 47 disposed in the lower mould cavity 411, and the upper and lower mould optical sensors 37, 47 are used to detect the infrared energy generated from the upper and lower heating members 331, 431, so as to prevent the semi-finished upper A from being damaged by high temperature. And the upper and lower mould optical sensors 37, 47 allow the operator to know that the machine 20 is heating, so as to achieve the protective effect of safe operation.

Figure 6:
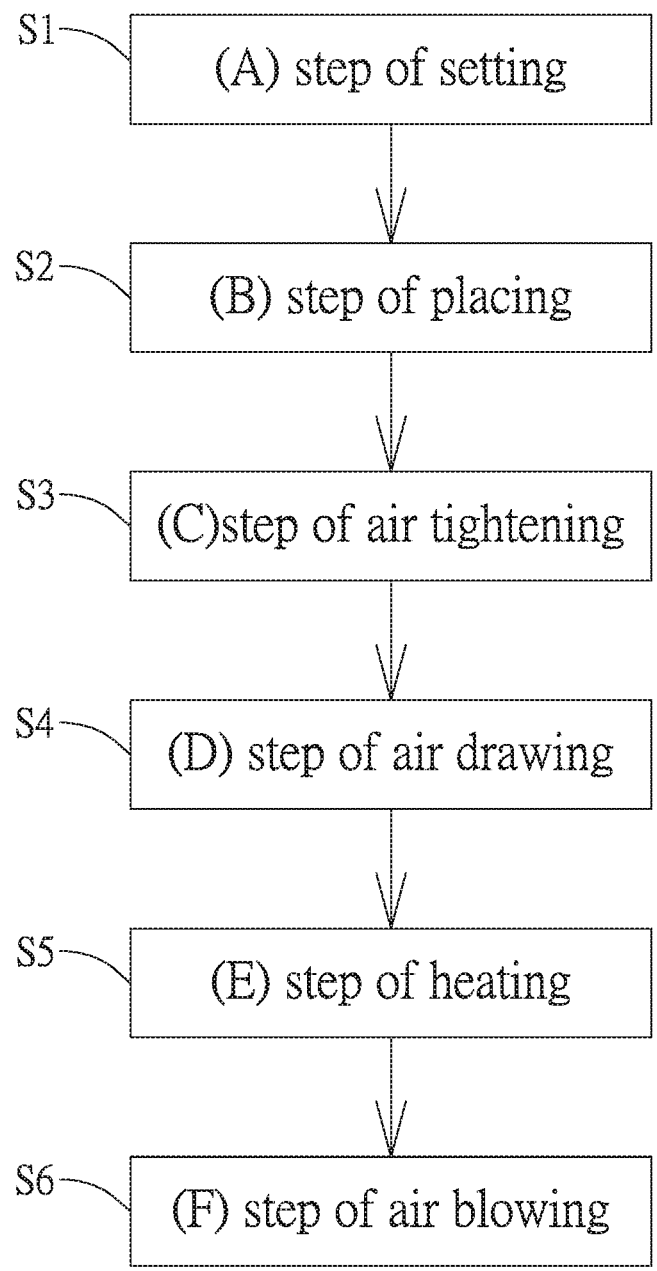
FIG. 6 is a flow chart showing the method for forming shoe upper decoration in accordance with the present invention.

What mentioned above are the main components and structures of the device for forming shoe upper decoration in accordance with the invention. As for the method for forming the upper decoration, reference should be made to the following descriptions. Before presenting the detailed description, it is important to note that, in the following descriptions, similar components are represented by the same number, as shown in FIGS. 5 and 6.

A method for forming shoe upper decoration comprises:

A), a step S1 of setting: putting an upper silica gel sheet 34 on an upper mould 30 and a lower silica gel sheet 44 on a lower mould 40;

B), a step S2 of placing: placing a semi-finished upper A on the lower silica gel sheet 44;

C), a step S3 of air tightening: moving and pressing the upper mould 30 against the lower mould 40 to create an air suction chamber 70;

D), a step S4 of air drawing: drawing air in lateral directions to create negative pressure in the air suction chamber 70;

E), a step S5 of heating: using an upper heater 33 in the upper mould 30 and a lower heater 43 in the lower mould 40 to heat the semi-finished upper A; and F), a step S6 of air blowing: applying pressure, by a positive pressure air source, to the upper silica gel sheet 34 of the upper mould 30 and the lower silica gel sheet 44 of the lower mould 40 to form decoration on the semi-finished upper A.

The technology of the above-mentioned method for forming shoe upper decoration is that it belongs to the lateral air suction type and does not require the use of a mould. Compared with the prior art way of air suction from below, if impermeable material is used as a substrate material during the air suction from below, it will produce the air-enveloping phenomenon, which is a problem of lacking material caused by the fact that air or gas have no time to escape effectively from the air suction chamber 70, so that the plastic cannot be effectively injected into a specific corner of the mould. Therefore, the invention can solve the defects of the existing technology by using the lateral air suction method and without requiring the use a mould.

To sum up, the invention provides a suspension indirect heating mode mainly through the upper heater 33, the lower heater 43, the upper silica gel sheet 34, and the lower silica gel sheet 44 which are separated by a distance, so as to prevent the semi-finished upper A from being deformed by the heat of a heat source, and to reduce the possibility of non-conforming products.

While we have shown and described various embodiments in accordance with the present invention, it is clear to those skilled in the art that further embodiments may be made without departing from the scope of the present invention.

What is claimed is:

1. A device for forming shoe upper decoration, comprising:
    a machine;
    an upper mould mounted on the machine in an extensible and retractable manner and including: an upper mould member with an upper mould cavity, an upper metal frame which is formed with an upper-metal-frame cavity and disposed in the upper mould cavity, an upper heater disposed in the upper-metal-frame cavity, and an upper silica gel sheet replaceably disposed on the upper metal frame to cover the upper-metal-frame cavity and located a distance from the upper heater; and
    two lower moulds movably mounted on the machine, capable of being connected to or disconnected from the upper mould, and including two lower mould members, each of the lower mould members including: a lower mould cavity, a lower metal frame which is formed with a lower-metal-frame cavity and disposed in the lower mould cavity, a lower heater disposed in the lower-metal-frame cavity, and a lower silica gel sheet replaceably disposed on the lower metal frame to cover the lower-metal-frame cavity and located a distance from the lower heater;
    wherein a lower airflow passage is formed between each of the lower mould cavities and a corresponding one of the lower metal frames, each of the lower moulds includes a lower mould outlet in communication with the lower airflow passage and running through a corresponding one of the lower mould cavities, and two spaced first positioning locks and two spaced second positioning locks aligned with the first positioning locks are disposed at two sides of each of the lower moulds.

2. The device for forming shoe upper decoration as claimed in claim 1, wherein the upper heater includes at least one upper heating member disposed inside the upper heater.

3. The device for forming shoe upper decoration as claimed in claim 2, wherein the upper heating member is an infrared lamp.

4. The device for forming shoe upper decoration as claimed in claim 1, wherein each of the lower heaters includes at least one lower heating member.

5. The device for forming shoe upper decoration as claimed in claim 4, wherein the at least one lower heating member is an infrared lamp.

6. The device for forming shoe upper decoration as claimed in claim 1, wherein an upper airflow passage is formed between the upper mould cavity and the upper metal frame, and the upper mould includes an upper mould outlet in communication with the upper airflow passage and running through the upper mould cavity.

7. A method for forming shoe upper decoration comprising:
    a step of setting including putting an upper silica gel sheet on an upper mould and a lower silica gel sheet on a lower mould;
    a step of placing including placing a semi-finished upper on the lower silica gel sheet;

a step of air tightening including moving and pressing the upper mould against the lower mould to create an air suction chamber;

a step of air drawing including drawing air in lateral directions to create negative pressure in the air suction chamber;

a step of heating including using an upper heater in the upper mould and a lower heater in the lower mould to heat the semi-finished upper; and a step of air blowing including applying pressure, by a positive pressure air source, to the upper silica gel sheet of the upper mould and the lower silica gel sheet of the lower mould to form decoration on the semi-finished upper.

* * * * *